United States Patent

Bildjukevich et al.

[11] 4,321,239
[45] Mar. 23, 1982

[54] METHOD OF THERMAL TREATMENT OF A CARBONATE SUSPENSION

[76] Inventors: Viktor L. Bildjukevich, ulitsa Surganova, 8, kv. 37; Boris K. Demidovich, 2 pereulok Rozy Ljuxemburg, 3-a, kv. 120; Dmitry T. Yakimovich, ulitsa Knorina, 10b, kv. 33; Leonid N. Turovsky, ulitsa Brestskaya, 86, kv. 36; Gennady Z. Plavnik, ulitsa Ya.Kolasa, 74, kv. 2; Valentina A. Lebedkova, ulitsa Odoevskogo, 36/7, kv. 92, all of Minsk; Anatoly P. Kupriyanenko, ulitsa Uritskogo, 31, kv. 47, Slutsk; Sofya L. Kozlova, ulitsa Avakiana, 36, korpus 2, kv. 55; Alexandr I. Pivovarov, ulitsa Gaya, 38, kv. 5, both of Minsk, all of U.S.S.R.

[21] Appl. No.: 184,014

[22] Filed: Sep. 4, 1980

[51] Int. Cl.³ .............................................. C01F 11/06
[52] U.S. Cl. .................................. 423/175; 423/177; 423/637
[58] Field of Search .................. 423/175, 177, 637

[56] References Cited

U.S. PATENT DOCUMENTS

| | | | |
|---|---|---|---|
| 2,480,904 | 9/1949 | Clarke et al. | 423/637 |
| 3,796,791 | 3/1974 | Nielsen et al. | 423/175 |
| 4,098,871 | 7/1978 | Schoppe | 423/177 |

Primary Examiner—O. R. Vertiz
Assistant Examiner—Wayne A. Langel
Attorney, Agent, or Firm—Holman & Stern

[57] ABSTRACT

Disclosed is a method of thermal treatment of a carbonate suspension yielding lime and $CO_2$-containing gas, such suspensions may be those resulting from a filtration sediment for sugar production, comprising in general the steps of dividing the carbonate suspension into two portions, spray-drying these portions both simultaneously and independently, calcining the material produced after suspension drying, cooling the lime produced after calcination, supplying the gas from the calcination zone for spray-drying the first portion of the suspension, withdrawing carbon dioxide recovery from the spent gas after spray-drying the first portion of the suspension, the calcination being carried out by means of the heat of the heat-carrier required for calcinating the material and spray-drying only the first portion of the suspension.

3 Claims, 1 Drawing Figure

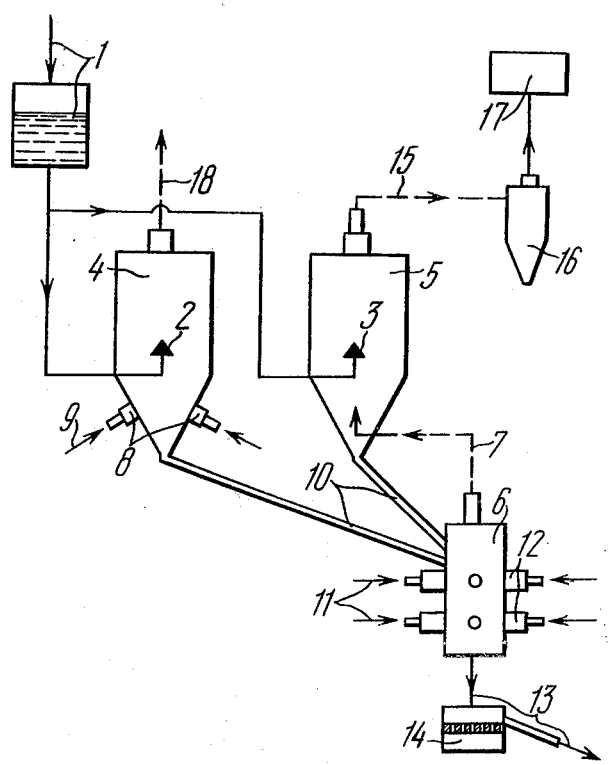

METHOD OF THERMAL TREATMENT OF A CARBONATE SUSPENSION

FIELD OF THE INVENTION

The present invention is concerned in general with the technology of thermal treatment of mineral suspensions to yield lime and gas containing carbon dioxide, and more specifically relates to methods of thermal treatment of a carbonate suspension.

The invention can be exploited to the utmost advantage in sugar production for the purpose of processing filtration sediments.

The invention is also well tailored for application in a number of other industries, e.g., in a construction material industry it can be employed for thermal treatment of calcareous slurries, in a chemical industry for thermal treatment of chemical water purification and pulp manufacture waste materials, in a food industry for thermal treatment of sewage water, etc.

BACKGROUND OF THE INVENTION

The worldwide problem of processing waste materials concomitant a variety of industries is nowadays gaining in importance. In numerous cases such waste materials are known to represent carbonate suspensions. Thus, in sugar production they are available in the form of filtration sediments resulting from the production process, in the chemical technology in the form of chemical water purification of waste materials, and so forth.

Commonly such suspensions exhibit an initial water content of 38 to 55%, while the dry fraction thereof includes some quantities of calcium carbonate ($CaCO_3$) (~80%), non-organic substances (approximately 80%) and organic substances (~12%). When processing them with a view to decompose the carbonate fraction, certain production processes involve a requirement concerning not only the derivation of highly active lime, but also the content of carbon dioxide in the waste gas so as to provide the possibility of utilizing this gas in the production process.

Thus, for example, the process of saccharine juice purification in the production of sugar makes use of lime and gas, the latter should comprise not less than 30% of carbon dioxide. What makes it difficult to obtain the gas of such a carbon dioxide content is that the suspension thermal treatment procedure following the conventional technology calls either for use of special-grade fuels containing an appreciable amount of carbon, such as coke and the like, or for use of specific facilities, such as electric calcining apparatus, or for use of oxygen blasting, since in the calcination, accomplished by means of ordinary apparatus employing liquid or gas fuel and air as an oxidizer, the content of carbon dioxide may reach theoretically only 27%. In actual production processes the content of carbon dioxide does not exceed 23–24%.

The thermal treatment using a solid fuel of a high carbon content is usually carried out in shaft furnaces, which significantly complicates the production process, inasmuch as separate suspension predrying and subsequent dry material briquetting procedures are made indispensible. In this case the lime has the form of briquets or cakes of considerable dimensions. It takes protracted periods of time to slake this lime, which extends the subsequent process of its slaking and deteriorates the quality of the calcareous suspension produced in the slaking.

Thus, it has become imperative to evolve the type of technology which would allow facile processing of a carbonate suspension in order to obtain lime and gas with a high content of carbon dioxide (30–35%) by means of an apparatus operating on liquid or gas fuel and air as an oxidizer, this being done at a minimum level of fuel consumption.

Along with rotating and multihearth furnaces, the present state of the art also makes extensive use of spray dryers and apparatus for the calcination of fluidized products enabling a fine-granulation product to be obtained. In this connection such apparatus can be contemplated as the most progressive for effecting the novel methods for treatment of carbonate suspensions.

Known in the art is a method of thermal treatment of a carbonate suspension in the form of a filtration sediment obtained from sugar production (see U.S.S.R. Inventor's Certificate No. 82010, Cl. 80 b 202, claims priority, May 10, 1948).

This method comprises the steps of predrying a filtration sediment, comminuting dried material and subsequently calcining the same to produce lime.

This prior art method is characterized by the fact that after comminution the dried material has a polydispersion granulometric composition, i.e. its composition includes both large pieces and a pulverized fraction as well. The calcination of this polydispersion material yields an ultimate product containing a substantial amount of burnt lime. This is attributable to the fact that the calcination of the small particles of the material at the same temperature takes a considerably shorter time for heating than the calcination of the large particles. As a result the calcination of the small particles with the same duration of heating at high temperatures results in burning. Thus, in order to improve the quality of the product the calcination should be preceded by sizing of particles. Furthermore, the fraction-by-fraction calcination of the particles of each and every size requires a number of separate units, one for each size. All this taken together makes the effectuation of the above method unnecessarily complex. In addition, the calcination of the polydispersion material is accompanied by considerable dust ejections, which brings about the contamination of the gas and increased expenditures for its treatment as well as losses of the finished material.

The prior art method is characterized by a fairly low carbon dioxide content in the waste gas and the possibility of controlling this content is not provided.

Known in the prior art is a method of calcining a calcareous slurry which is a waste of the kraft pulp activation process (see Japanese Pat. No. 48115, Cl. 15 F221, Int. Cl. COIF, published Apr. 12, 1972). This method comprises predrying a calcareous slurry of an initial water content of 40% to a final water content of 3%, mixing the same with 10% of granulated lime produced by means of a double-chamber briquetting press and granulated to a grain size of about 1 mm, and with 5–10% of limestone with an average grain diameter of about 3 mm, drying the resulting mixture to a water content of 2 to 5%, granulating the mixture by means of the press to a granule size of 35–50 mm and subsequently calcining the granules in a shaft furnace. It should be noted that in the foregoing method, the flow chart is fairly complicated due to the preparation of the mixture of the above three components prior to their granulation. Each of the components also undergoes a number of appropriate preparatory procedures, namely, the lime is ground, sized in a special separator and handled for separation of the particles of 1 mm in size, whereupon they are briquetted.

Furthermore, the calcination of the granulated briquetted mixture is carried out with the use of special kinds of fuel. Usually this is a fuel having a high carbon content such as of coke, the cost of which is higher than that liquid or gasiform fuel. In many cases this fuel is to be transported over substantial distances to the location of the shaft furnace, which also adds to the cost of fuel and makes the process more expensive. It is also noteworthy that the process of calcination in the shaft furnace is conducted for a long period of time and consequently is hardly amenable to control and automation.

The finished lime produced by this prior art method has the form of briquets or lumps which slowly hydrate in water thus increasing the duration of obtaining lime milk from the lime upon its further processing.

Known in the prior art is a method of producing lime and carbon dioxide-containing gas from a carbonate suspension which is a filtration sediment resulting from sugar production (see G.E. Kroneberger, Lime Recalcination in the U.S. Sugar Industry, Sugar Technology, Reviews, 4, 1976/77, pp. 3–47). The method under consideration comprises predrying a filtration sediment on the filter beds from a water content of 45% to a water content of 28% and further drying and calcining the same in a multihearth vertical calcinator. Drying of the carbonate suspension (i.e. filtration sediment) is accomplished by the gas discharged from the calcination area. The gas spent after drying and including carbon dioxide is passed for recovery to the process of lime milk carbonization. The above-described method is characterized by the fact that the waste gas after drying contains a fairly low amount of carbon dioxide (12 to 16%). Such a low content of carbon dioxide in the gas makes it practically unfeasible to use it in a sugar production process. Another particularity of the method consists in the fact that while propagating through the multihearth vertical calcinator, the product is continually mixed. Hence, the product is susceptible to excessive attrition and has a polydispersion make-up. This results in increased dust ejections from the multihearth vertical calcinator and in deteriorated finished lime due to the presence of particles of different degrees of dissociation. Moreover, the method shows a low intensity level of heat- and mass-transfer processes, since heat is supplied to the material in the heat-transfer process by way of thermal conduction, while thermal convection is actually absent. Therefore the treatment process is an objectionably protracted procedure, which handicaps control of the process due to the fact that a check on the properties of the material can be made only after it has gone through the entire process.

Also known in the prior art is a method of treatment of a carbonate suspension in the form of a sugar production filtration sediment yielding lime and carbon dioxide-containing gas by means of preliminary mechanical dehumidification of a carbonate suspension (i.e. filtration sediment) in a centrifuge (to a water content of 37%) followed by further drying and calcination of the carbonate suspension in a rotating kiln (see G. F. Kroneberger, Lime Recalcination in the U.S. Sugar Industry, Sugar Technology, Reviews, 4, 1976/77, pp. 3–47). This method is characterized by the fact that the spent gas leaving the rotating kiln includes a relatively small amount of carbon dioxide (14–16%), which encumbers its further use. Furthermore, high temperatures intrinsic in the waste (spent) gas (200°–250° C.) impairs the efficiency of the process. Additional operating costs are also incurred due to the fact that the rotating kiln has considerable overall dimensions (thus, for instance, a kiln whose throughput amounts to 1.200 kg/day is 2.9 m in diameter and 80 m in length), occupies a sizable portion of the production area and calls for substantial expenditures of time for its maintenance, startup and shutdown. The process conducted in the rotating kiln is a lengthy procedure (lasting a few hours), which makes process control a difficult matter.

Known in the prior art is a method of fabricating calcinated, pulverized lime from ground raw material or suspension, in particular from the waste materials of sugar production, which comprises drying the raw material and heating the same to a temperature lower than that of dissociation by a flow of the waste gas of the calcinator, calcinating the same in a gas flow and removing burnt lime from the calcination zone beyond the calcinator, and separating lime particles from the aforesaid gas flow (Cf. French Pat. No. 2,291,161, Cl. 04 B 1/02; C 13 D 3/02; F 27 B 1/100, publ. Feb. 6, 1976). In this method the material of the calcination zone moves in a direct flow with the gas flow, which interferes with the production of lime of high chemical activity on account of its potential interaction with carbon dioxide included in the gas, i.e. recarbonization (repeated combination of calcium oxide and carbon dioxide). Consequently, the content of carbon dioxide in the spent gas cannot be sufficiently high. The lowered content of carbon dioxide also stems from the large amount of air supplied to the calcinator since, according to the invention, the ratio of the excess air directed to burning amounts to 1.6 to 2.0. This also leads to a decreased temperature of the burning fuel, and a chemical and mechanical incompleteness of fuel combustion, which entails an increase in the consumption of fuel and reduces the efficiency of the method. The prior art method, apart from the above-mentioned, is also characterized the fact that the material produced from the suspension prior to its calcination, is not granulated. Owing to this, the material (lime) produced after its calcination is not subjected to uniform thermal treatment. The large particles of the material dissociate incompletely. The removal of the small particles of the material from the calcination zone necessitates a sophisticated process for their separation from the gas flow. All this involves much complexity in transportation and storage of the pulverized material. As a result, the operating costs tend to increase. Heating of the material to a temperature of 400° to 800° C. before its calcination may cause sublimation of the organic component and the appearance of noxious admixtures (carbon oxide and the like) in the spent gas.

Also known in the prior art is a method of recovering lime from calcareous sludge (Cf. U.S. Pat. No. 3,796,791, Cl. 423-177, publ. Dec. 3, 1974) which is most closely related in its technical essence to the subject of the present invention.

According to this method the calcareous sludge with a moisture content in the range from 40 to 60% is divided into two portions. One portion of the sludge is dried in a spray drier to a pulverized condition by the heat of the gas discharged from the calcination zone, whereafter the dried pulverized material is mixed with the other portion of the sludge to produce nonpulverous material with a moisture content in the range from 16 to 17%. This material is fed to a vertical multihearth calcinator and subjected to drying and heating to a temperature of 800° to 950° C. The carbonate fraction undergoes dissociation yielding lime—calcium oxide (CaO) and carbon dioxide ($CO_2$). The resulting lime is cooled, while the gas from the calcinator is directed to the spray drier. The carbon dioxide-containing gas spent after drying is passed to utilization, i.e. to the process of saccharine juice purification.

The above-described prior art method is characterized by the fact that the spent gas directed to utilization includes a fairly low quantity of carbon dioxide (23.3%), which makes it difficult to use it in the manufacturing process since, for example, the gas directed to utilization in the production of sugar is prescribed by the technological requirements to contain not less than 30% of carbon dioxide. Another factor which makes the method lengthy and complex is the step of mixing the dry powder with the wet suspension. According to this prior art method, thermal treatment of the material introduced into the multihearth furnace does not enable the process of heat- and mass-transfer to be intensified since the convective heat-transfer portion in such a method of thermal treatment is not large.

With the above method of thermal treatment the calcinator burns down the total amount of fuel required both for the calcination of the material and for the drying of the carbonate suspension. As this takes place, heat losses from the calcinator to the atmosphere tend to grow, which may result in the present overconsumption of fuel. Moreover, the amount of carbon dioxide in the gas passed to utilization is not controlled.

SUMMARY OF THE INVENTION

It is an object of the invention to increase the content of carbon dioxide in the gas.

Another object of the instant invention is to reduce the duration of the carbonate suspension treatment process.

Still another object of the invention is to lower the consumption of fuel required for the production of lime and gas containing carbon dioxide.

Still another object of the invention is to simplify the carbonate suspension treatment process.

Yet another object of the invention is to make provision for controlling the content of carbon dioxide in the gas.

Yet another object of the present invention is to reduce the content of dust in the gas and to eliminate noxious impurities therefrom.

A further object of the invention is to intensify the processes of heat and mass transfer in the treatment of a carbonate suspension.

A still further object of the invention is to make provision for producing granulated bulk material of such a form which is easy to hydrate, thus decreasing the expenses for liming upon further lime treatment.

With these and other objects in view there is proposed a method of thermal treatment of a carbonate suspension yielding lime and gas containing carbon dioxide, such as a filtration sediment of sugar production, comprising dividing the suspension into a first and a second portions, spray-drying of the first portion of the suspension, calcinating by a heat-carrier the material produced from both of the portions of the suspension, cooling the lime obtained after calcination, feeding the gas from the calcinating zone to the spray-drying of the first portion of the suspension, removing the gas spent after spray-drying to the recovery of carbon dioxide, wherein, according to the invention, the spray-drying of the first portion of the suspension is conducted concurrently with the autonomous spray-drying of the second portion of the suspension, whereafter the material produced by spray-drying of the second portion of the suspension is calcined concurrently with the material produced by spray-drying of the first portion of the suspension, the calcination being accomplished by means of the heat of a heat-carrier required for calcining said material and drying only the first portion of the suspension, while the recovery of carbon dioxide is effected by means of removal of the spent gas obtained in drying only the first portion of the suspension.

The division of the suspension into the first and second portions combined with the effectuation of the simultaneous autonomous spray-drying of each of the aforesaid portions of the suspension, as well as the implementation of the calcination of the entire dried material by means of the heat of a heat-carrier required only for calcinating the material and spray-drying only the first portion of the suspension enable the consumption of fuel expended for the drying and calcination of the above-mentioned material to be rationally distributed.

As a result, the gas discharged during calcination from the calcinating zone is employed for drying only the first portion of the suspension. Thus, the calcination is carried out solely by the heat carrier necessary for calcining the entire dried material and drying only the first portion of the suspension. Consequently, this brings about an increase in the content of carbon dioxide in the gas discharged from the calcining zone (this gas represents a mixture of the gas produced from the combustion of fuel and the carbon dioxide produced in the dissociation of the carbonate fraction of the dried material), since the amount of the gas produced from the combustion of fuel decreases and, hence, the percentage of carbon dioxide in the gas mixture increases. The portion of the fuel expended for drying the second portion of the suspension is consumed autonomously and therefore the gas produced from the combustion of this fuel is not mixed with the gas flow leaving the calcining zone and having an increased content of carbon dioxide. By virtue of this fact the gas flow with an enhanced carbon dioxide content is delivered for recovery, this content amounting to 30–35%. The simultaneous spray-drying of the two portions of the suspension together with the simultaneous feeding of the dried material from these two portions of the suspension for calcination result in the reduced duration of the process as well as in its simplification.

According to one embodiment of the invention it is preferred that the content of carbon dioxide in the spent gas be controlled by varying the amount of the second portion of the suspension dried autonomously, and an increase being caused in this amount brings about an increase in the content of carbon dioxide in the spent gas.

Such an embodiment of the method enables the content of carbon dioxide in the gas directed for recovery in the simplest way possible.

According to still another embodiment of the method, it is preferred that the step of drying the suspension be conducted over the temperature range equal to 100° to 200° C. and the material produced by drying of the suspension be supplied to the calcing zone which is maintained at a temperature of 550° to 1200° C.

The drying process conducted over the temperature range equal to 100° to 200° C. prevents sublimation of the suspended organic components during drying and, consequently, prevents noxious admixtures from penetrating into the gas passed for recovery.

The feeding of the material produced by drying of the suspension to the calcining zone having a temperature of 550° to 1200° C. ensures ignition and complete combustion of the organic fraction of the material without releasing carbon monoxide and other harmful impurities and also permits reduction full consumption due to heat liberation in the combustion of the organic fraction of the material.

The foregoing objects and advantages of the present invention will be more apparent from consideration of the following detailed description and embodiments thereof with reference being made to the drawing.

BRIEF DESCRIPTION OF THE DRAWING

The drawing illustrates a basic flow chart for the process of thermal treatment of a carbonate suspension, according to the invention.

DETAILED DESCRIPTION OF THE INVENTION

The proposed method of thermal treatment of a carbonate suspension yielding lime and gas containing carbon dioxide is illustrated by the process flow chart shown in the drawing. A carbonate suspension 1 is divided into two portions (first and second). The second portion of the suspension 1 is passed to a disperser 2, and the first to a disperser 3. By means of the dispersers 2 and 3, both of the portions of the suspension 1 are dispersed in spray driers 4 and 5, respectively.

Drying of the suspension 1 in the spray drier 5 is accomplished by the heat of the gas 7 discharged from a calcinator 6. Drying of the suspension 1 in the spray drier 4 is accomplished by the autonomous supply of heat from a device 8 for the input of a heat-carrier 9. Spray-drying of the suspension 1 in the spray-driers 4 and 5 is carried out in a simultaneous manner. The dried material, consisting of granules formed by drying, is passed from the outlet of each of the spray-driers 4 and 5 via pipes 10 to the calcinator 6 for calcination. A heat-carrier 11 is fed to the calcinator 6 by burners 12. As this takes place, the consumption of fuel supplied to the calcinator 6 is maintained at a level which is minimum and sufficient for calcining the entire pulverized material and for drying only the first portion of the suspension 1 in the spraydrier 5. In the calcinator 6 the dried granulated material is heated in a fluidized state to a temperature of 950° to 1050° C. In this process the material undergoes dissociation yielding lime 13 and carbon dioxide. The resulting lime 13 is passed from the calcinator 6 to a cooler 14 for cooling. The cooled lime 13 is delivered to a finished product storage (not shown). The spent gas 15 with a high content of carbon dioxide (in the range from 30 to 35%) is passed from the drier 5 for carbon dioxide recovery after cleaning in scrubber 16, to a utilizer 17.

The spent gas 18 from the spray-drier 4 is released to the atmosphere after cleaning due to the small content of carbon dioxide remaining (in the range from 20 to 22%). When required, however, it may also be recycled for recovery. Control of the absolute amount and percentage of carbon dioxide in the gas 15, supplied for recovery, is effected by changing the amount of the second portion of the suspension 1 dried autonomously in the spray-drier 4. In this case the amount of the second portion of the suspension can be varied over the range of 20 to 80% of the total amount of the suspension 1. By increasing this amount an increase in the content of carbon dioxide in the gas 15 is gained.

To eliminate the possibility of the formation of harmful admixtures (carbon oxide and the like) as a result of the potential sublimation of the organic component of the carbonate suspension 1, the latter is dried at a temperature of 100° to 200° C. and the dried pulverized material is fed to the zone of the calcinator 6, the latter maintained at a temperature of 550° to 1200° C. Drying of the suspension within the temperature range from 100° to 200° C. eliminates organic component sublimation yielding carbn monoxide and other undesirable inclusions which, as required by the process technology, are not permissible in the gas intended for recovery, the process of juice saturation in sugar production being an example. Feeding of the dried material to the zone of the calcinator 6, which is maintained at a temperature of 550° to 1200° C., ensures ignition of the organic component and its complete combustion without releasing carbon monoxide. Furthermore, in this case burning of the organic component is accompanied by the liberation of heat allowing reduction of fuel consumption for the process by 10-15%.

Below are given examples of the method of thermal treatment of carbonate suspensions yielding lime and gas containing carbon dioxide.

EXAMPLE 1

Consider by way of an example the method of thermal treatment of a carbonate suspension (filtration sediment) which is the waste material resulting from sugar production. The filtration sediment from sugar production represents a pasty suspension with a moisture content of 38-50%. The chemical composition of the dry matter is as follows, in mass percent: $CaCO_3$, 90.4; organic additives, 4.2; mineral admixtures, 5.4. With allowance made for 2.0% powder ejection, to produce 1 kg of lime (CaO) having a chemical activity of 85.0% there is required 1.86 kg of the filtration sediment (on a dry basis). Thus, to produce 1 kg of lime with a chemical activity of 85.0% there is consumed 3.76 kg of the suspension with a moisture content of 50%.

The starting suspension 1 is divided into two portions, each being 50 mass percent in volume. One portion of the suspension 1 is fed at a pressure of 2.0-2.5 MPa to the disperser 2 and dispersed in a drying chamber of the spray drier 4, while the other portion is fed at the same pressure to the disperser 3 and dispersed in a drying chamber of the spray drier 5. The spray drier 4 receives from the devices 8 the gaseous heatcarrier 9 with a temperature of 700° to 800° C. produced in the combustion of fuel, either in an autonomous furnace, or directly in the device 8. The portion of the suspension 1 in the spray-drier 4 is dried at a temperature in the drying zone 150°-180° C. to a pulverized condition. The temperature of the gas 18 discharged from the spray drier 4 ranges from 100°-120° C. The content of carbon dioxide in the gas 18 amounts to 10-12% on a dry gas basis. The dried pulverized material having a moisture content of 0.5-1.0% is passed via the pipeline 10 to the calcinator 6.

Drying of the other portion of the suspension 1 in the spray drier 5 is accomplished by the heat of the gas 7 discharged from the calcinator 6 a a temperature of 600°-650° C. As this takes place, the temperature in the drying zone ranges between 150°–180° C. The dried material is passed via the pipeline 10 to the calcinator 6. The gas 15, spent after drying, with a 30% content of carbon dioxide goes through cleaning and cooling in the scrubber 16 and is directed for recovery to the utilizer 17 which is, in this case, a saturator for sugar production.

The calcinator 6 receives the heat-carrier with a temperature of 1200°–1750° C. produced by the combustion of the fuel 11 (gas or fuel oil) in the burners 12. The amount of fuel supplied to the calcinator 6 is a minimum amount required only for drying of the portion of the suspension 1 directed to the spray drier 5 and for thermal decomposition of the carbonate fraction of the material.

The ratio between the amount of fuel supplied to the spray drier 4 for autonomous drying and to the calcinator 6 is: 1:1.18.

In the calcinator, the dried material is fed to the flow of the heat-carrier in a countercurrent manner and heated therein. It should be noted that due to the fact that the reaction of calcium carbonate decomposition is endothermal (i.e. proceeds with the absorption of heat), the temperature of the gas suspension in the calcinator becomes equal to 1000°–1200° C. The material produced in drying of the two portions of the suspension 1 arrives at the temperature zone of 1000°–1200° C. in the calcinator and is heated to 950°–1000° C. While this occurs, the residual moisture is removed from the material, the organic component completely burns down without the release of noxious admixtures (carbon monoxide and the like) and the carbonate fraction undergoes dissociation with the formation of lime and the release of carbon dioxide.

Combustion of the organic component of the dried material proceeds with the liberation of heat, which enables to save 14–16% of the fuel.

The resulting lime 13 is directed from the calcinator 6 for cooling to the cooler 14. Cooled to 40°–60° C., the lime 13 enters the production process for slaking to obtain lime milk used for saccharine juice purification.

The produced lime is a fine-granulated nonpulverable product of a monodisperse constitution with a particle size primarily equal to 300–400 mcm. The concentration of active calcium oxide amounts to 85.6%.

The lime thus obtained is characterized by improved reactivity, i.e. the slaking time is up to 8 minutes, and it contains practically no unslaked grains. High-speed thermal treatment of the monodisperse material allows to accomplish essentially complete dissociation of calcium carbonates, the residual content of carbon dioxide in the material not exceeding 1.5%.

EXAMPLE 2

Consider by way of an example the method of thermal treatment of a carbonate suspension (filtration sediment) which is the waste material from sugar production.

The chemical composition of the dry suspension fraction is given in Example 1.

The starting suspension 1, in much the same manner described in Example 1, is divided into two portions. The volume of one portion is 80% and that of the other is 20% of the total amount of the suspension 1 subjected to thermal treatment. The conditions of thermal treatment of each of the portions of the suspension 1 in the driers 4 and 5 are maintained identical to those of Example 1, in this case 80% of the suspension is dried in the spray drier 4 and 20% of the suspension is dried in the spray drier 5. The entire dried material is fed to the calcinator 6. The ratio of the consumption of fuel supplied to the spray drier 4 and to the calcinator 6 is 2.3:1. As a result of a decrease in the consumption of fuel burned in the calcinator 6, the percentage of carbon dioxide in the spent gas 15 increases to 35% (on a dry gas basis). The quality of the lime 13 obtained after thermal treatment remains the same as that of Example 1.

EXAMPLE 3

Consider by way of example the method of thermal treatment of a suspension composed of friable chalk material contaminated with impurities.

The friable chalk raw material has a natural moisture content of 25% and represents a pasty mass. This raw material contains up to 13–15% of silicon dioxide ($SiO_2$) and in consequence of this it cannot be exposed to direct thermal treatment because such treatment would produce inferior-quality lime. For the above-mentioned reason the raw material is converted to a suspension and the suspension is cleaned with the help of filters or other appliances.

Thus, the friable chalk raw material is converted to a suspension 1 with a moisture content of 40% which is cleaned of the inclusions of silicon dioxide in vibration cleaners (not shown). The chemical composition of the dry fraction of the suspension is as follows, in mass percent: $CaCO_3$, 94.0; $SiO_2$, 3.4; $Al_2O_3$, 1.5; $MgCO_3$, 0.6; $Fe_2O_3$, 0.5.

With allowance made for irrevocable powder ejection of the dry fraction of the raw material from the production process (3.0%) to produce 1 kg of lime (CaO) with a chemical activity of 85.0% it takes 1.7 kg of the dry raw material or 2.833 kg of the suspension having a moisture content of 40%.

The suspension 1 is divided into two portions whose volumes are 80 and 20% of the total amount of the suspension 1. The portion of the suspension 1 with a volume of 80% of the total amount is dispersed at a pressure of 2.0–2.5 MPa by the disperser 2 in the spray drier 4. The heat-carrier 9 having a temperature of 800°–900° C. is introduced by means of the devices 8. The heat-carrier 9 is obtainable either by the combustion of fuel in an individual furnace (not shown), or by the direct combustion of fuel in the devices 8. Drops of the dispersed suspension are dried in the spray drier 4 at a temperature of 130°–200° C. in the drying zone to microgranules with a size of 400–500 mcm and a moisture content of 0.2–1.2%.

The other portion of the suspension 1 with a volume of 20% is dispersed at a pressure of 2.0–2.5 MPa in a spray drier 5 and dried by the heat of the gas 7 with a temperature of 680°–720° C. discharged from the calcinator 6. The dried material having a final moisture content 0.4–1.6% has the form of microgranules with a size of 350–400 mcm. The dried material is fed from the spray driers 4 and 5 via the pipes 10 to the zone of the calcinator 6 with a temperature of 850°–900° C. The heat-carrier produced from the combustion of the fuel 11 in the burners 12 enters the calcinator 6 with a temperature of 1200°–1750° C.

The ratio between the amount of fuel supplied to the spray drier 4 for autonomous drying and to the calcinator 6 for calcination of the dried material is 2.6:1.

In the calcinator 6 the residual moisture is removed from the material and its carbonate fraction undergoes dissociation with the formation of calcium oxide (lime) and carbon dioxide. As a result, the content of carbon dioxide in the gas 7 and in the gas 15 directed for recovery increases to 35%. It should be noted that in the process of calcination in the calcinator 6 the material moves countercurrently with the gas, which enables to obtain the lime of high activity because the process of recarbonization is excluded. The lime 13 arrives for cooling at the cooler 14, wherein its temperature is lowered from 950°–1000° C. to 40°–60° C., and then passed to the production process or for packaging.

The resulting lime is a fine-granulated nonpulverable product of a monodisperse constitution with a particle size primarily equal to 200–300 mcm. The concentration of active calcium oxide is 85.1%. The lime slaking time is 7 minutes.

The spent gas 15 containing 35% of carbon dioxide is cooled in the scrubber 16 from 140°–180° C. to 50°–70° C., cleaned of dust and passed for recovery to the utilizer 17 where it is used for saccharine juice purification. The slaked lime 13 in the form of lime milk can also be utilized in saccharine juice purification.

The gas discharged from the drier 2 with a temperature of 100°–120° C. and a small content of carbon dioxide (12–14%) is released to the atmosphere after treatment.

While the foregoing exemplificative embodiments relate to the process of fabricating lime and carbon dioxide employed in sugar production, the invention is also applicable to a variety of processes requiring the regeneration of lime from carbonate suspensions.

From the above detailed description of the present invention it is apparent to those skilled in the art that all of the objects of the invention are achievable in the scope defined by the claims. However, it is also perfectly evident that some unessential variations and modifications can be made in the disclosed method of thermal treatment of carbonate suspensions. All such variations and modifications are not considered to depart substantially from the scope and spirit of the invention defined by the following claims.

Thus, for example, having altered the operating conditions of the dispersers and their design features, at a user's request there can be obtained material with a different size of granules from 200 to 800 mcm.

Furthermore, having introduced some modifications into the conditions of drying and calcination, the method can be advantageously used for the production of nonabsorbent mineral fertilizers as well as other products of carbonate suspension treatment.

What is claimed is:

1. A method of thermal treatment of a carbonate suspension yielding lime and carbon dioxide-containing gas, such as a filtration sediment of sugar production, comprising the sequential steps of:
   (a) dividing said suspension into a first portion and a second portion;
   (b) spray-drying said first and second portions of said suspension accomplished simultaneously and independently for each of said portions and passing the dried material directly to step (c);
   (c) calcining by a heat-carrier the dried material produced in step (b) from said first and second portions of said suspension to yield lime and carbon dioxide;
   (d) cooling the lime produced after said calcining;
   (e) supplying the gas from the zone of said calcining to the region in which spraydrying of said first portion of said suspension occurs;
   (f) withdrawing and recovering carbon dioxide from the spent gas after step (b) spray-drying of said first portion of said suspension;
   effecting said calcining by means of the heat provided by said heat-carrier required for calcining said dried material and said spray-drying only said first portion of said suspension.

2. The method of claim 1, wherein the content of said carbon dioxide in said spent gas is controlled by varying the amount of said second portion of said suspension dried independently, an increase in this amount causing an increase in the content of said carbon dioxide in said spent gas.

3. The method of claim 1, wherein said spray-drying said both portions of said suspension is conducted in the temperature range from 100° to 200° C. and said dried material produced by spray-drying said both portions of said suspension is supplied to the calcining zone, said zone having a temperature of 550° to 1200° C.

* * * * *